United States Patent
Miyazaki (10) Patent No.: US 10,298,852 B2
(45) Date of Patent: May 21, 2019

(54) IMAGE CAPTURING APPARATUS, CONTROL METHOD AND PROGRAM THEREOF

(71) Applicant: CANON KABUSHIKI KAISHA, Tokyo (JP)

(72) Inventor: Yasuyoshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/331,592

(22) Filed: Oct. 21, 2016

(65) Prior Publication Data

US 2017/0118390 A1    Apr. 27, 2017

(30) Foreign Application Priority Data

Oct. 27, 2015   (JP) ................................. 2015-210714
May 27, 2016   (JP) ................................. 2016-106640

(51) Int. Cl.
  *H04N 5/235* (2006.01)
  *H04N 1/21* (2006.01)
  *H04N 5/265* (2006.01)
  *H04N 5/232* (2006.01)

(52) U.S. Cl.
  CPC ......... *H04N 5/2352* (2013.01); *H04N 1/2133* (2013.01); *H04N 5/2351* (2013.01); *H04N 5/23245* (2013.01); *H04N 5/265* (2013.01); *H04N 2201/0084* (2013.01)

(58) Field of Classification Search
  CPC .... H04N 5/23245; H04N 5/235–5/243; H04N 1/2133; G03B 7/00–7/30
  See application file for complete search history.

(56) References Cited

U.S. PATENT DOCUMENTS

| | | | | |
|---|---|---|---|---|
| 2015/0015774 | A1* | 1/2015 | Sugie | H04N 5/2353 348/364 |
| 2015/0086176 | A1* | 3/2015 | Komiya | H04N 5/2353 386/226 |
| 2015/0271407 | A1* | 9/2015 | Tanaka | H04N 5/23245 348/220.1 |
| 2015/0312462 | A1* | 10/2015 | Sakamaki | H04N 5/2354 348/370 |
| 2017/0214837 | A1* | 7/2017 | Tamura | H04N 5/2352 |
| 2017/0374259 | A1* | 12/2017 | Nakamura | H04N 5/2352 |
| 2018/0035034 | A1* | 2/2018 | Nakata | H04N 5/2351 |

FOREIGN PATENT DOCUMENTS

JP    2015-139029 A    7/2015

* cited by examiner

*Primary Examiner* — Paul M Berardesca
(74) *Attorney, Agent, or Firm* — Canon U.S.A., Inc. IP Division (57) ABSTRACT

An image capturing apparatus that performs intermittent image capturing to acquire a moving image composed of combined plural images includes an imaging means, a luminance value acquisition means configured to acquire a luminance value of a subject of which image is to be captured, an exposure control means configured to control exposure according to the acquired luminance value, and a range setting means configured to set a predetermined range in which changing the exposure according to a change of the luminance value is not executed. The range setting means sets the predetermined range based on information related to time when intermittent image capturing is performed.

23 Claims, 8 Drawing Sheets

IMAGE CAPTURING APPARATUS, CONTROL METHOD AND PROGRAM THEREOF

BACKGROUND

Field of Art

The present disclosure relates to an image capturing apparatus for performing intermittent image capturing, and a control method and a program thereof.

Description of the Related Art

Conventionally, a technique to capture images of a subject in an intermittent manner (so-called interval image capturing) is known. Japanese Patent Laid-Open No. 2015-139029 proposes a technique perform automatic exposure image capturing using an exposure value which is automatically calculated based on a photometric value obtained by measuring a subject light immediately before each image capturing when a plurality of images are acquired by intermittently performing image capturing with previously set image capturing intervals.

SUMMARY

An image capturing apparatus performs intermittent image capturing to acquire a moving image which is composed of combined plural images. The image capturing apparatus includes an image capturing unit configured to capture an image of a subject, a luminance value acquisition unit configured to acquire a luminance value of the subject, an exposure control unit configured to control exposure according to the luminance value acquired by the luminance value acquisition unit, and a range setting unit configured to set a predetermined range in which the exposure control unit does not change the exposure according to a change of the luminance value acquired by the luminance value acquisition unit. The range setting unit sets the predetermined range based on information related to time when intermittent image capturing is executed.

Further features of aspects of the present invention will become apparent from the following description of exemplary embodiments (with reference to the attached drawings).

DESCRIPTION OF THE EMBODIMENTS

Embodiment (Fundamental Configuration of Digital Camera 100)

Figure 1:
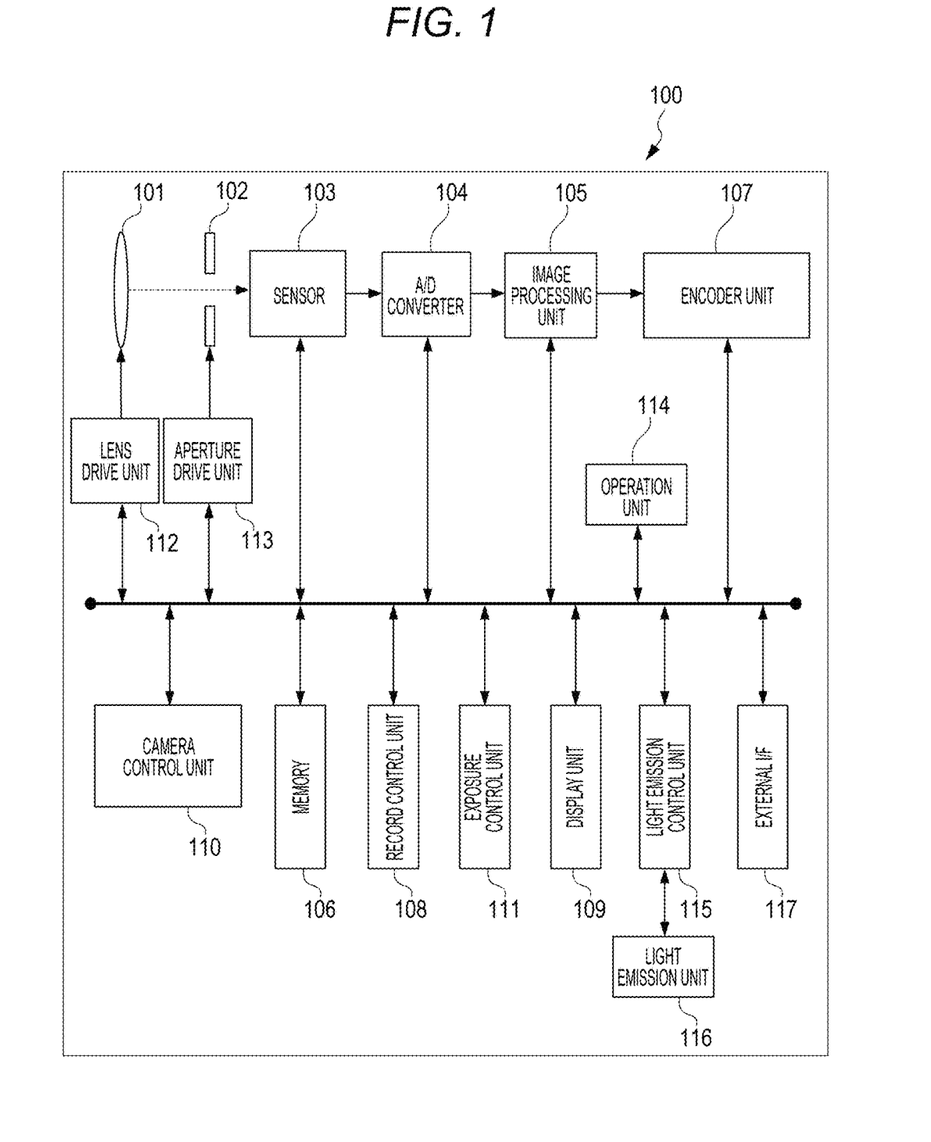
FIG. 1 is a block diagram illustrating a configuration example of a digital camera 100 as an embodiment of an image capturing apparatus to which aspects of the present invention are applied.

An embodiment of the present invention will be explained with reference to the attached drawings. FIG. 1 is a block diagram illustrating a configuration example of a digital camera (hereinafter, simply referred to as a camera) 100 as an embodiment of an image capturing apparatus to which the present invention may be applied. Here, one or more of the function blocks illustrated in FIG. 1 may be realized by hardware such as an ASIC or a programmable logic device (PLA), or the like or may be realized by software executed by one or more of a programmable logic device such as a CPU, an MPU, or the like. Further, it may be realized in a combination of software and hardware. Thus, in the following explanation, even when a different function block is described as an operating subject, same hardware may serve as the subject.

As illustrated in FIG. 1, an imaging lens group 101 is an optical element that includes a focus lens, zoom lens, a shift lens, and the like. An aperture 102 is a light amount adjustment member to adjust the amount of luminous flux of a subject that passes from the imaging lens group 101 to a sensor 103. A sensor 103 is a solid-state imaging element of a charge accumulation type such as a CCD, a CMOS, or the like and is an imaging means that performs a photoelectric conversion (imaging) of luminous flux of a subject inserted via the imaging lens group 101 to generate analog image data. An A/D converter 104 is a conversion means that converts analog image data output from the sensor 103 into digital image data. An image processing unit 105 is an image processing means that performs various processes such as a WE adjustment process, tone processing, or the like on the digital image data output from the A/D converter 104.

A memory 106 is a storage means that is capable of electrically deleting and storing such as an EEPROM, which is represented by a flash memory or the like, and can record data related to behavior of the camera 100 or various data acquired by the camera 100. The memory 106 records, in advance, a constant number, various exposure conditions, a calculation formula, and the like which are used in the behavior of the camera 100. An encoder unit 107 is a conversion means that converts digital image data into data in a recording format. A record control unit 108 is a control means that controls recording of image data in the camera 100 and controls conversion of digital image data in the encoder unit 107 based on previously set record format. A display unit 109 is a display means that may be composed of a TFT LCD (thin film transistor-driven liquid crystal display) that displays acquired image data, and can display analog image data or the like for displaying, which is digital image data converted by a D/A converter (not shown).

A camera control unit 110 is a control means that integrally controls the behavior of the camera 100. Here, the camera control unit 110 also serves as a luminance value acquisition means that acquires, based on the acquired image data, a luminance value of the image data. More specifically, the camera control unit 110 divides the acquired image data into a plurality of blocks and calculates an average luminance value of luminance values of each block.

Then, the camera control unit 110 integrates the average luminance values of each block and acquires a representative luminance value. In the following explanation, the representative luminance value is simply referred to as a luminance value and is used in various processes and controls such as an exposure control. Here, in the present embodiment, the luminance value is acquired based on the image data acquired using the sensor 103; however, the luminance value may be acquired using a dedicated light metering sensor other than the sensor 103.

An exposure control unit 111 is an exposure control means that controls the exposure when image data is acquired using the sensor 103 and is capable of controlling the exposure according to the luminance value acquired by the camera control unit 110. According to the present embodiment, the exposure control unit 111 controls, as the exposure, an aperture value related to an opening degree of the aperture 102, a shutter speed related to charge accumulation time of the sensor 103, and an image capturing sensitivity related to an analog or digital gain amount. Here, in the memory 106, information (table data or the like) related to the exposure (proper exposure) corresponding to the luminance value is stored in advance. The exposure control unit 111 can set a proper exposure according to the luminance value, based on the information. Further, the exposure control unit 111 also serves as a range setting means that sets a later described non-exposure follow-up range (predetermined range) ΔBvTH. The detail will be mentioned in the explanation of a later described time-lapse moving image acquisition method.

Figure 2:
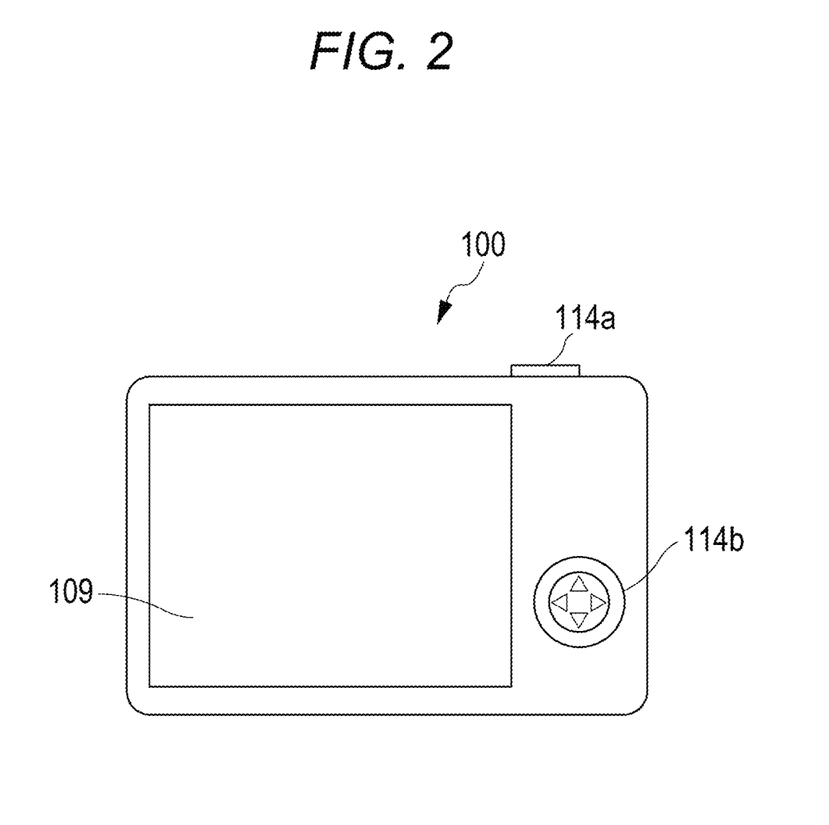
FIG. 2 is an outline view of the digital camera 100 as the embodiment of the image capturing apparatus to which aspects of the present invention are applied.

A lens drive unit 112 is a drive means that operates the imaging lens group 101 according to an instruction from the camera control unit 110. An aperture drive unit 113 is a drive means that drives the aperture 102 according to an instruction from the exposure control unit 111. An operation unit 114 is an operation means that is capable of executing operation input related to each behavior of the camera 100. FIG. 2 is an outline view of the camera 100, which is an embodiment of the image capturing apparatus to which aspects of the present invention may be applied. As illustrated in FIG. 2, as the operation unit 114, a release switch 114*a* that can instruct to start a subject image capturing preparation behavior or an image capturing behavior and an operation button 114*b* that can perform operation input related to each behavior of the camera 100. Here, as the display unit 109, a so-called touch panel or the like that the user can operate is employed and the display unit 109 may also serve as the operation unit 114.

A light emission control unit 115 is a control means that controls a light emission amount, light emission timing, and the like of a light emission unit 116 when subject image capturing with light emission of the light emission unit 116 (hereinafter, referred to as light emission image capturing) is performed based on a light emission determination by the camera control unit 110. An external I/F 117 is a connection means that controls a connection of the camera 100 with an external device (not shown) or an external memory (not shown) provided outside the camera 100. The above description is a fundamental configuration of the camera 100 according to the present embodiment.

(Image Capturing Behavior)

Hereinafter, a subject image capturing behavior of the camera 100 will be explained. Firstly, the camera control unit 110 detects that the release switch 114*a* is operated in a condition that power is being supplied to each unit of the camera 100 and starts the subject image capturing behavior. As the image capturing behavior, firstly, a shutter (not shown) provided between the imaging lens group 101 and the sensor 103 retracts from a light path and the luminous flux passes through the imaging lens group 101 forms an image at the sensor 103. Next, according to an instruction from the camera control unit 110, the exposure control unit 111 operates each unit of the camera 100 and sets the exposure for acquiring a luminance value, based on the information previously registered in the memory 106. Then, the camera control unit 110 performs image capturing and controls the sensor 103 to read accumulated charge and output analog image data. The A/D converter 104 performs a sampling adjustment, a gain adjustment, an A/D conversion on the analog image data output from the sensor 103 and outputs digital image data. The image processing unit 105 performs various types of image processing on the digital image data output from the A/D converter 104 and outputs the processed digital image data.

The camera control unit 110 acquires a luminance value (a representative luminance value) based on the acquired (digital) image data. Then, the exposure control unit 111 executes an exposure control and sets a proper exposure corresponding to the acquired luminance value. Further, the camera control unit 110 calculates distance information from the camera 100 to the subject (distance to subject) based on acquired image data. Then, the camera control unit 110 sets lens position of the focus lens of the imaging lens group 101 to focus on the subject based on the calculated distance no subject (AF (auto focus) control). According to the present embodiment, the image processing unit 105 acquires an evaluation value used in a focus detection (hereinafter, referred to as a contrast evaluation value) based on image data contrast information acquired as shifting the lens position of the focus lens. Then, the camera control unit 110 calculates the distance to subject based on the acquired contrast evaluation value. Here, the distance-to-subject calculation method is not limited to this example. For example, the distance to subject may be calculated by a so-called phase difference detection method by separately providing a sensor for the AF control or providing a pixel used to detect a phase difference in a plurality of pixels that compose the sensor 103. The above has been explained the image capturing preparation behavior of the camera 100.

When the image capturing preparation behavior of the camera 100 is completed, the camera control unit 110 performs image capturing with the previously set exposure and at the lens position of the focus lens and acquires analog image data. Since the behavior before the image processing by the image processing unit 105 has been described above, the explanation thereof will be omitted. The digital image data on which various types of image processing has been performed is converted into a recording format via the encoder unit 107 and stored in the memory 106 by the record control unit 108. Further, after a D/A conversion unit (not shown) converts the digital image data into analog image data for displaying, the camera control unit 110 displays the image data on the display unit 109. The above has described a fundamental image capturing behavior of the camera 100. Here, the above explanation has described a configuration that a series of behaviors from the image capturing preparation to the recording and displaying of the image data is continuously executed according to an operation of the release switch 114*a* by the user; however, this explanation does not set any limitation. For example, it may be in a configuration that the image capturing preparation behavior is executed in response to SW1 condition (for example, a half-depressed condition) of the release switch 114*a* and the image capturing behavior is executed in response to an SW2 condition (for example, a fully-pressed condition) of the release switch 114*a*.

(Time-Lapse Moving Image Acquisition Method)

The camera 100 according to the present embodiment can set a plurality of modes such as a normal moving image mode, time-lapse moving image mode, and the like, as an image capturing mode to acquire a moving image. The normal moving image mode is an image capturing mode to execute, by the sensor 103, a plurality number of charge accumulation (image capturing) within a second and display the acquired plurality pieces of image data as sequentially combining. On the other hand, the time-lapse moving image mode is a mode to execute, by the sensor 103, charge accumulation (image capturing) with intervals of at least about one second and displays the acquired plurality of images as sequentially combining. The moving image acquired with this configuration is a moving image in which temporal changes are compressed (hereinafter, referred to as a time-lapse moving image) and the (reproduction) time of the moving image is short compared to the total image capturing time to acquire a single time-lapse moving image. Each image capturing mode can be set by an operation on the operation button 114*b* by the user. Hereinafter, behavior of the camera 100 in a case that the time-lapse moving image mode is set will be explained.

In the time-lapse moving image mode, in response to user's image capturing start instruction, the camera 100 can perform intermittent image capturing based on image capturing time intervals and total number of image capturing (or, total image capturing time or the like) which are set by the user in advance. By executing this continuous image capturing, the camera 100 can acquire a plurality of temporally continuous pieces of image data (hereinafter, simply referred to as images) which are used to acquire a moving image in which the plurality of images are combined. Then, the camera control unit 110 can combine the plurality of images to one another and acquires a time-lapse moving image, which is a moving image in which temporal changes are compressed. Here, the above described image capturing time interval is a time interval of sequential image capturing in intermittent image capturing related to generation of a single time-lapse moving image. In other words, the above described image capturing time interval is a time interval to perform sequential image capturing to acquire a plurality of images (still images) used to generate a single time-lapse moving image. According to the present embodiment, as the image capturing time interval, 1 second, 30 seconds, 1 minute, 15 minutes, 30 minutes, 1 hour, 3 hours, 5 hours, 10 hours, and 24 hours are set in advance and a user can set any time interval from the above. Here, settable image capturing time intervals are not limited to this example and for example, the user may freely set any time interval. Further, the total number of the above image capturing is the number of intermittent image capturing to acquire a plurality of images used to generate a single time-lapse moving image. Thus, the above described total number of image capturing is relevant to the total number of the plurality of images used to generate a single time-lapse moving image. The camera 100 according to the present embodiment can set, as the total number of image capturing, from two to infinitude (for example, until the power is turned off).

The image capturing time interval and the total number of image capturing can be set by the user by operating the operation button 114*b* and the information related to the set image capturing time interval and total number of image capturing is registered in the memory 106. The camera control unit 110 reads information related to the image capturing time interval and total number of image capturing, which is registered in the memory 106, and executes intermittent image capturing in the time-lapse moving image mode. Then, the camera control unit (a moving image acquisition means) 110 generates a time-lapse moving image by combining (connecting) the plurality of images acquired in the time-lapse moving image mode in order of the image capturing (in order of the acquisition).

Figure 3A:
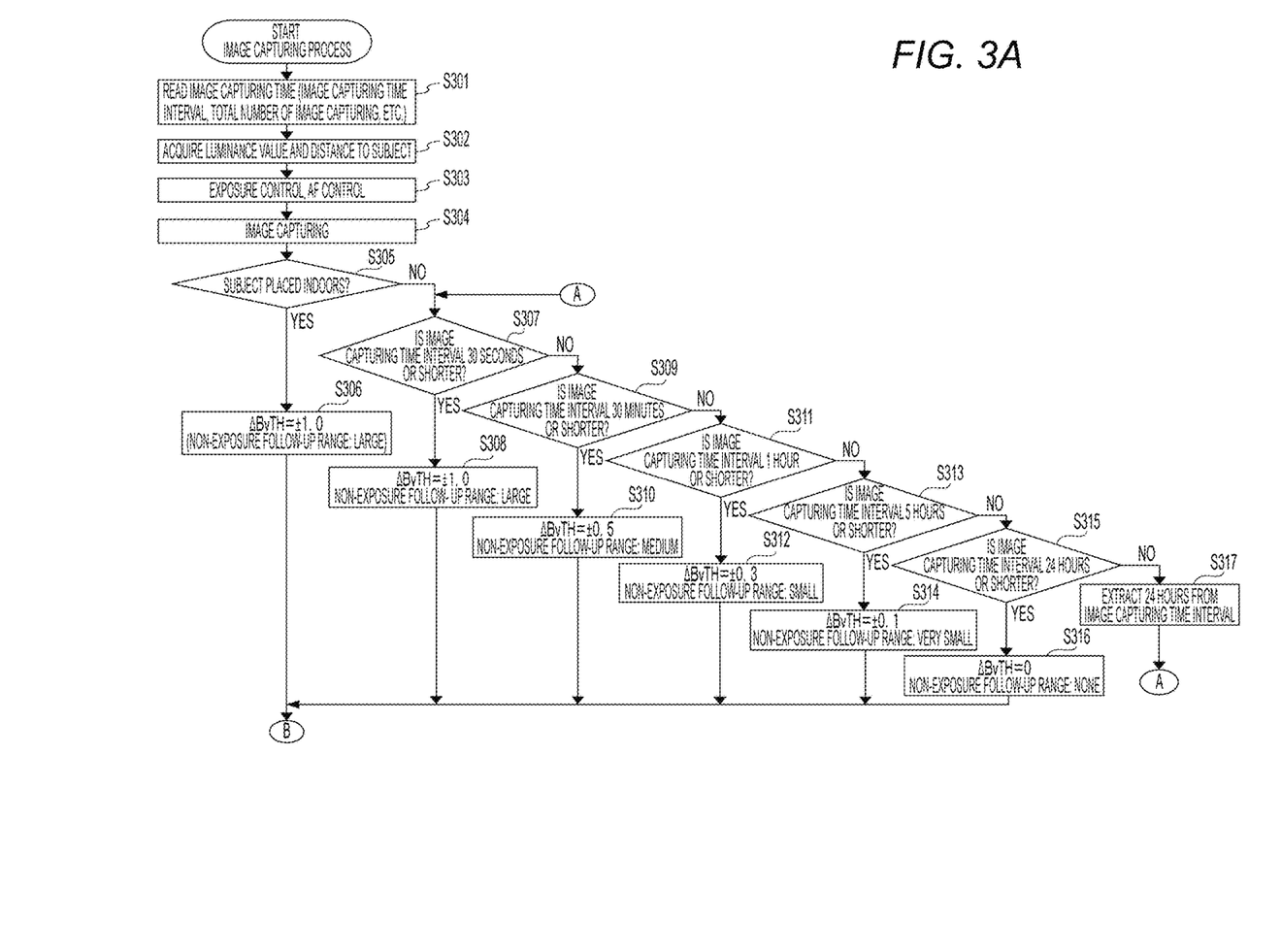
FIGS. 3A and 3B are flowcharts explaining an image capturing process according to an embodiment of the present invention.
Figure 3B:
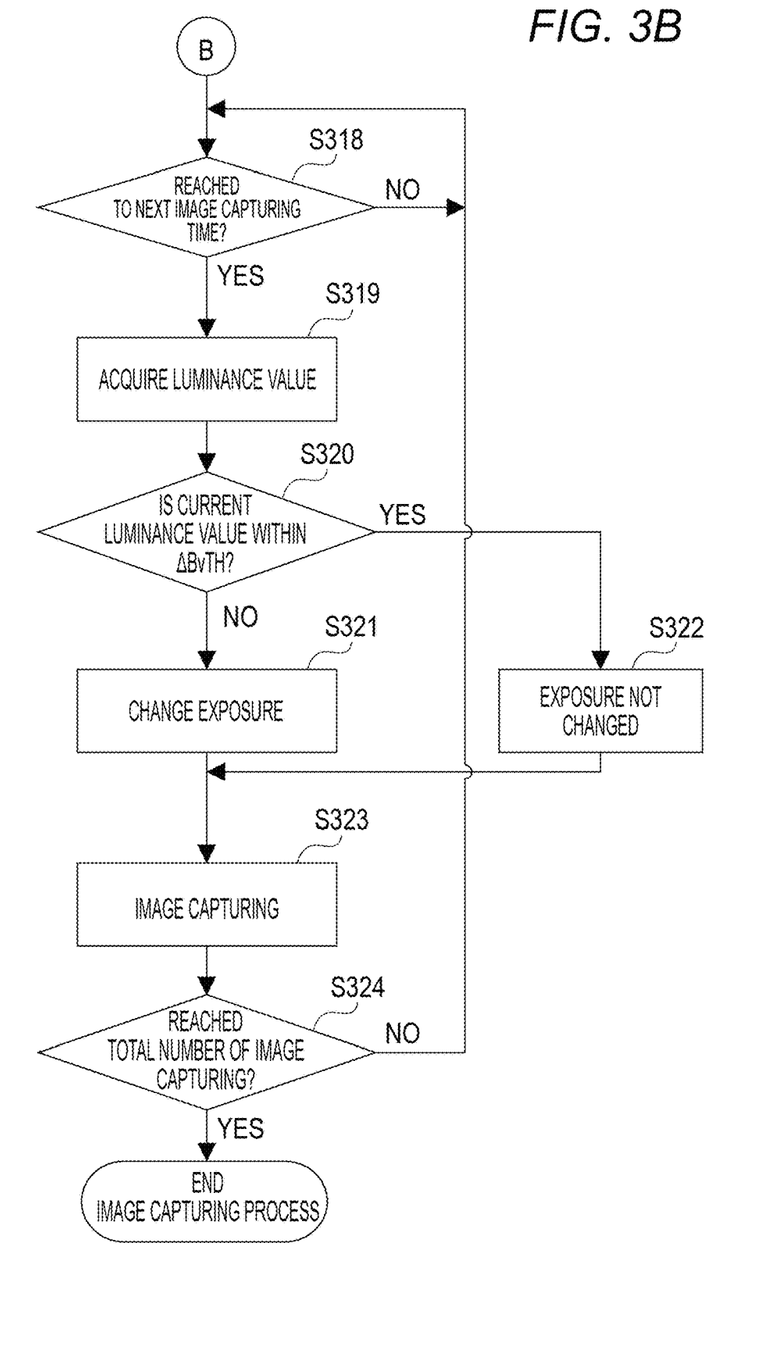

A process related to an image capturing behavior to acquire a plurality of images for a time-lapse moving image (hereinafter, simply referred to as an image capturing process) will be explained with reference to FIGS. 3A and 3B. FIGS. 3A and 3B are flowcharts that explain an image capturing process according to the embodiment of the present invention. Here, in the following explanation, it is assumed that the image capturing time interval and total number of image capturing are set by the user in advance.

As illustrated in FIGS. 3A and 3B, when the user instructs to start image capturing in the time-lapse moving image mode, the camera control unit 110 reads information related to the image capturing time interval and total number of image capturing registered in memory 106 in step S301. Next, in step S302, the camera control unit (a luminance value acquisition means) 110 acquires a luminance value and distance to subject based on the image acquired using the sensor 103. Next, in step S303, the exposure control unit 111 executes an exposure control based on the acquired luminance value and sets a proper exposure corresponding to the luminance value. Further, the camera control unit 110 executes an AF control operation based on the acquired distance to subject. The acquired information of the luminance value, exposure, distance to subject, or the like is registered in the memory 106 by the record control unit 108. Next, in step S304, the camera control unit 110 uses the sensor 103 to perform image capturing (the current image capturing). With this current image capturing, the first image used to generate the time-lapse moving image acquired. Further, in step S304, the camera control unit 110 starts a time measurement with a timer (not shown), which is provided inside the camera control unit 110.

Here, a method for seeing a non-exposure follow-up range (a predetermined range) ΔBvTH in the time-lapse moving image mode will be explained. As described above, the camera 100 is a made to execute an exposure control based on the luminance value acquisition and the luminance value, every time each image capturing during intermittent image capturing is executed in the time-lapse moving image mode. In other words, the camera 100 according to the present embodiment can automatically change the exposure according to the changes in the luminance value (hereinafter, referred no as an exposure follow-up), every time sequential image capturing is performed. By executing this exposure follow-up, since images that have brightness according to the changes in the luminance values can be acquired in the respective sequential image capturing, the brightness of the entire image can be made to be the brightness according to the changes in the luminance values in the respective images acquired in the sequential image capturing. However, when simply executing the exposure follow-up, the brightness of the subject in the images may vary between the plural images since the brightness of the entire image is made to be the brightness according to the changes in the luminance values in the respective images.

Figure 4:
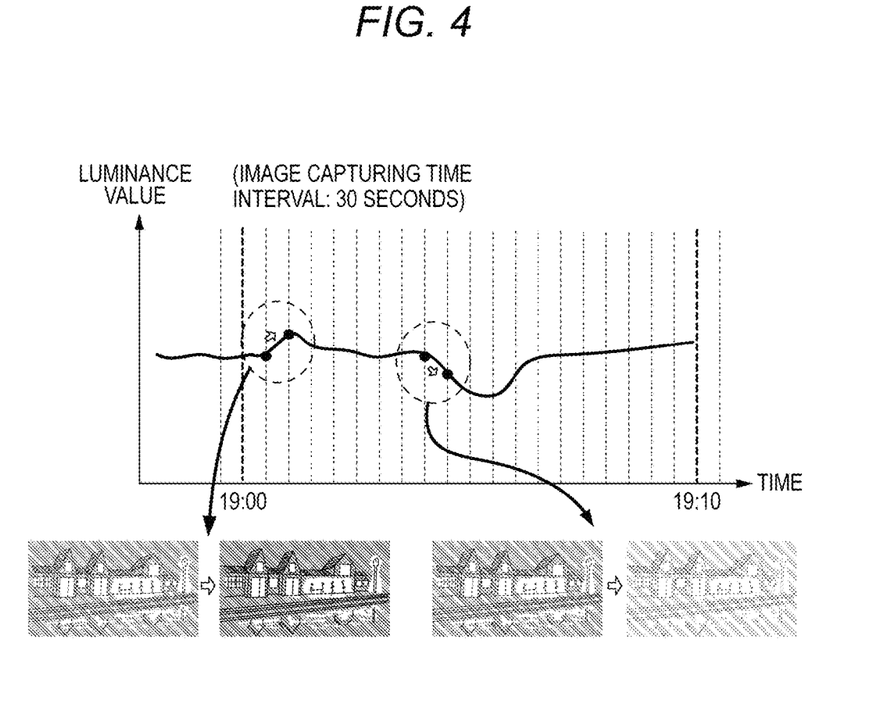
FIG. 4 is a diagram illustratively explaining changes in luminance values when intermittent image capturing is performed.

FIG. 4 illustratively explains this manner. FIG. 4 is a diagram that explains a case that changes in the luminance values when intermittent image capturing is performed and the image capturing time interval is set as 30 seconds. In the graph of FIG. 4, the horizontal axis represents elapsed time, the vertical line represents luminance values, and the solid line represents the changes in the luminance values, respectively. Further, in the lower part of FIG. 4, images sequentially acquired in the areas indicated by the dashed lines are illustrated.

As illustrated in FIG. 4, when an exposure follow-up is executed in intermittent image capturing, for example, due to the changes in the brightness of a human subject part in the image, the brightness of parts other than the human subject part (building, background, or the like) in the image varies. In other words, when the exposure follow-up is executed, changes in the brightness of a certain subject (one part) in an image cause changes in the brightness of other subjects (other parts).

Thus, the brightness of subjects in each image may vary among plural images acquired in sequential image capturing by simply executing the exposure follow-up in the time-lapse moving image mode. In this case, by combining the plural images that have varied brightness of subjects, a time-lapse moving image with varied brightness in frames may be acquired. In other words, the quality of the time-lapse moving image is reduced due to the varied brightness of subjects among the plural images.

Figure 5:
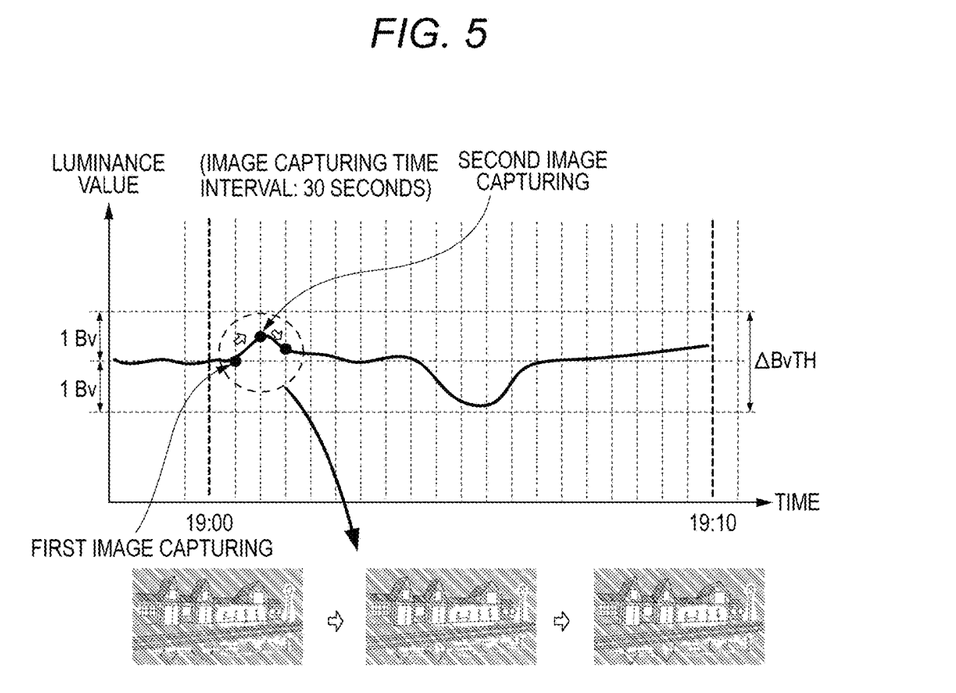
FIG. 5 is a diagram illustratively explaining changes in brightness between images acquired when a non-exposure follow-up range $\Delta BvTH$ is set and intermittent image capturing is performed.

In order to solve the problem, it is considered to set a range (non-exposure follow-up range) $\Delta$BvTH in which exposure changing according to the change in the luminance values is not executed (the exposure follow-up is not executed). This non-exposure follow-up range $\Delta$BvTH is a range (related to the luminance value), which is set based on the luminance values acquired by the camera control unit 110. In other words, the non-exposure follow-up range $\Delta$BvTH is actually a range that defines whether or not the change of the exposure is executed according to the change in the luminance and, in the present embodiment, it is assumed to be a range that the exposure is not changed according to the change in the luminance values. In the present embodiment, the exposure control unit 111 sets the range of the luminance values with respect to the acquired luminance values as the non-exposure follow-up range $\Delta$BvTH. For example, when the non-exposure follow-up range $\Delta$BvTH is ±1.0, the luminance value range of ±1 Bv in additive system of photographic exposure (APEX) units with respect to the acquired luminance value is a range that the exposure is not changed according to the change in the luminance values (blind zone). This configuration can prevent the brightness of each subject from frequently varying in the plural images. This manner will be illustratively explained with reference to FIG. 5. FIG. 5 is a diagram that illustratively explains changes in brightness among images acquired when the non-exposure follow-up range $\Delta$BvTH is set and intermittent image capturing is performed. As illustrated in FIG. 5, when the exposure is not changed until the luminance value changes greater than the non-exposure follow-up range $\Delta$BvTH, it can prevented the brightness of the subject from frequently varying among the plural images acquired in the time-lapse moving image mode.

Figure 6:
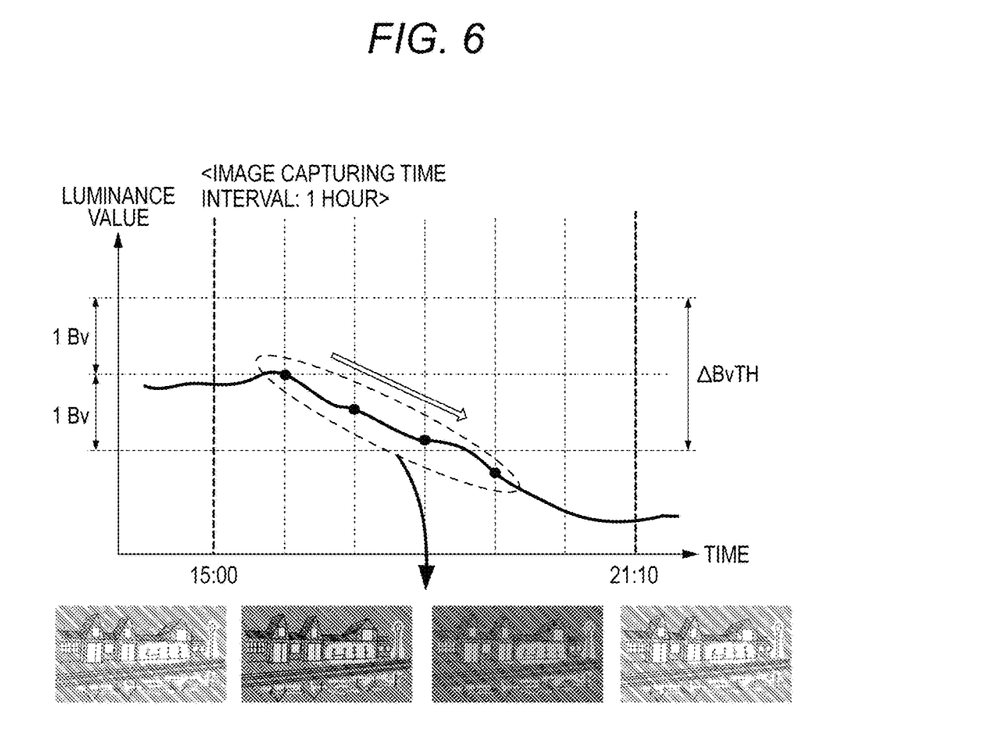
FIG. 6 is a diagram illustratively explaining changes in luminance values and changes in brightness when an image capturing time interval in a time-lapse moving image mode is 1 hour.

However, when performing intermittent image capturing, the degree of changes in the luminance values differs according to the image capturing time interval of sequential image capturing. Thus, when the non-exposure follow-up range $\Delta$BvTH is set without considering the image capturing time interval, the brightness in the plural images may vary in an unnatural manner. The details will be explained with reference to FIG. 6. FIG. 6 is a diagram that illustratively explains changes in the luminance values and changes in the brightness of plural images in case that the image capturing time interval in the time-lapse moving image mode is 1 hour. As illustrated in FIG. 6, when the image capturing time interval is relatively long such as 1 hour, the brightness of the entire image likely varies due to the changes in environmental light. In other words, when the image capturing time interval of the intermittent image capturing is relatively long, changes in the luminance values generated in sequential image capturing likely occur due to the changes in environmental lights. Thus, in a case that the image capturing time interval in the time-lapse moving image mode is relative long, the brightness of the entire image gradually changes before the luminance value varies exceeding the non-exposure follow-up range $\Delta$BvTH if the non-exposure follow-up range $\Delta$BvTH is wide. Then, when the luminance values vary as exceeding the non-exposure follow-up range $\Delta$BvTH, the brightness of the entire image rapidly changes.

On the other hand, in a case that the image capturing time interval in intermittent image capturing is relatively short such as 30 seconds, the changes of the luminance values likely occur due to an instantaneous change of the brightness of the subject. In other words, in this case, the possibility that the luminance value varies due to the changes in environmental light. Here, in a case that the non-exposure follow-up range $\Delta$BvTH is narrow, the brightness of the subject in the plural images varies every time the luminance value varies as exceeding the non-exposure follow-up range $\Delta$BvTH.

In short, in a case that the image capturing time interval of intermittent image capturing is relatively long, a plurality of images with the unnaturally changed brightness of the entire image are acquired if a wide non-exposure follow-up range $\Delta$BvTH is set. Further, in a case that the image capturing time interval of the intermittent image capturing is relatively short, a plurality of images with the unnaturally changed brightness of the subject in the images is acquired if a narrow non-exposure follow-up range $\Delta$BvTH is set. Thus, when a time-lapse moving image is generated using plural images acquired in the above condition, since the moving image of which quality is reduced due to variation of the brightness among frames is acquired and this gives a user who has viewed this moving image uncomfortable feelings. Therefore, the camera 100 according to the present embodiment deals with the above problem, when performing intermittent image capturing, by controlling the size of the non-exposure follow-up range $\Delta$BvTH based on information related to time when intermittent image capturing is performed. Hereinafter, the details will be explained.

Referring back to FIGS. 3A and 3B, in step S305, the camera control unit (a determination means) 110 determines whether or not a (main) subject as an image capture target is placed indoors. In the process in step S305, any method may be employed as long as it can determine whether or not the subject as an image capture target is placed indoors. According to the present embodiment, it is determined whether or not the subject as an image capture target is placed indoors by the camera control unit 110 that determines whether the camera 100 is placed indoors. More specifically, the camera control unit 110 determines that the camera 100 is placed indoors when the previously acquired luminance value is equal to or lower than Bv4 in APEX unit and the distance to subject is shorter than 5 m, and determines that the camera 100 is placed outside in other conditions. When it is determined that the camera 100 is placed indoors based on the determination result, the camera control unit 110 determines that the subject as an image target is placed indoors and, when it is determined that the camera 100 is not placed indoors, the camera control unit 110 determines that the subject as an image capture target is placed outside. Here, the luminance value and distance to subject, which are used in the above determination, are not limited to the above example and any number may be employed as long as it can be used to determine that the camera 100 is placed indoors. Further, it is preferable as long as the determination is performed based on at least the previously acquired luminance value.

Here, the process in step S305 may be executed by the camera control unit 110 based on the location information of the camera 100 acquired with a location measurement system such as a GPS (global positioning system). Further, the process in step S305 may be executed based on information manually input by the user In other words, the location of the subject as an image capture target may be determined based on information related to the location of the subject as an image capture target that is manually input by the user.

When the camera control unit 110 determines that the subject as an image capture target is placed indoors, it is assumed that the changes in environmental light are small around the subject. Here, in step S306, the exposure control unit 111 sets the non-exposure follow-up range $\Delta$BvTH as ±1.0 stop. It is noted that the non-exposure follow-up range $\Delta$BvTH set in step S306 may be any value as long as it is a relatively wide fixed value. With this configuration, in the time-lapse moving image mode, it is prevented that the quality of the acquired moving image is reduced when capturing images of a subject placed indoors where the changes in environmental light is small.

Next, in step S307, the camera control unit 110 determines whether or not the set image capturing time interval is equal to or shorter than 30 seconds. When the camera control unit 110 determines that the image capturing time interval is equal to or shorter than 30 seconds (YES in step S207), in step S308, the exposure control unit (a range set means) 111 sets the non-exposure follow-up range $\Delta$BVTH as ±1.0 stop. In this case, as illustrated in FIG. 5, regarding the luminance value for first image capturing, the exposure at second image capturing is not changed until the luminance value for the second image capturing executed after a predetermined time interval after the first image capturing changes greater than an amount of 1 Bv. Thus, as illustrated in a lower part of FIG. 5, the camera 100 can prevent the brightness of the subject from changing in the plural images acquired by performing sequential image capturing.

Similarly to above described steps S307 and S308, in the processes in following steps S309 to S316, the exposure control unit (a range setting means) 111 sets the non-exposure follow-up range $\Delta$BvTH based on the previously set image capturing time interval. For example, when the image capturing time interval is longer than 30 seconds and equal to or shorter than 30 minutes, the exposure control unit 111 sets the non-exposure follow-up range $\Delta$BvTH as ±0.5 stops (steps S309 and S310). Further, when the image capturing time interval is longer than 30 minutes and equal to or shorter than 1 hour, the exposure control unit 111 sets the non-exposure follow-up range $\Delta$BvTH as ±0.3 stops (steps S311 and S312). Further, when the image capturing time interval is longer than 1 hour and equal to or shorter than 5 hours, the exposure control unit 111 sets the non-exposure follow-up range $\Delta$BvTH as ±0.1 stop (steps S313 and S314). Further, when the image capturing time interval is longer than 5 hours and equal to or shorter than 24 hours, the exposure control unit 111 sets the non-exposure follow-up range $\Delta$BvTH as 0 stop (steps S315 and S316). In other words, the non-exposure follow-up range $\Delta$BvTH is not set in this case.

Figure 7:
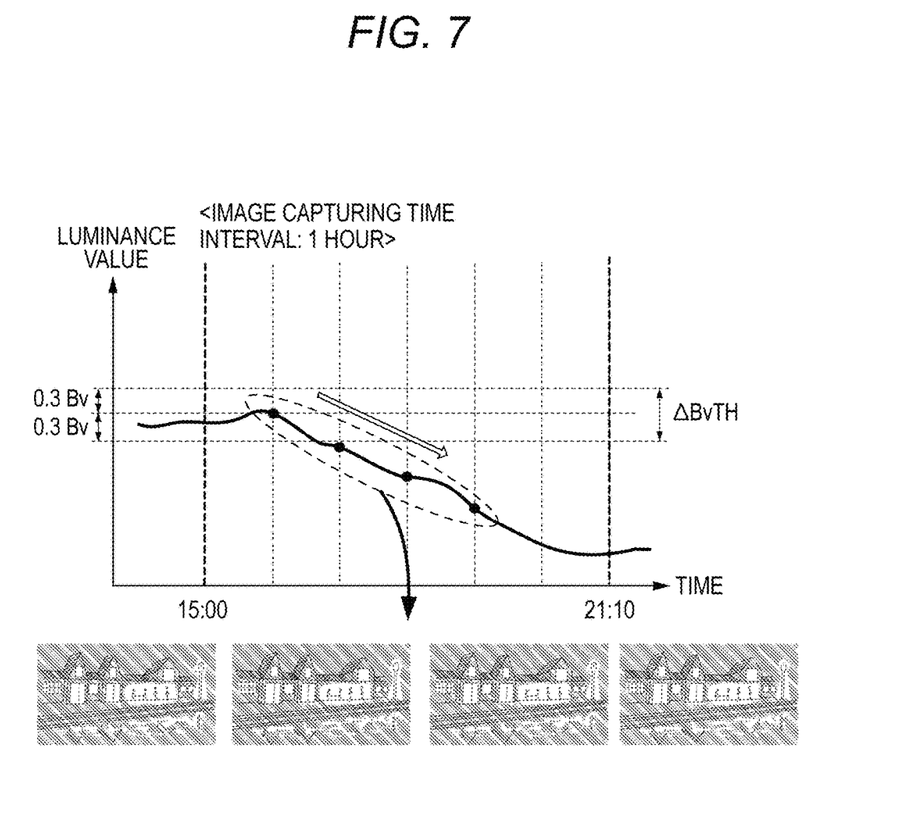
FIG. 7 is a diagram illustratively explaining changes in brightness of plural images acquired in the image capturing process according to an embodiment of the present invention.

In the above described processes in step S306 to S316, the ranges (sizes) of the settable non-exposure follow-up range $\Delta$BvTH are ±1.0 stop (large), ±0.5 stops (medium), ±0.3 stops (small), ±0.1 stop (extra small), and 0 stop; however, this example does not set any limitation. Values other than the above may be employed as the size of the non-exposure follow-up range $\Delta$BvTH settable in camera 100. Further, also regarding the time interval used to compare with the image capturing time interval set by the user is not limited to the above example and other time intervals may be employed. For example, the exposure control unit 111 may set the non-exposure follow-up range $\Delta$BvTH as ±2.0 stops when the image capturing time interval is equal to or shorter than 1 minute and may set the non-exposure follow-up range $\Delta$BvTH as 0.05 stops when the image capturing time interval is equal to or longer than 8 hours and equal to or shorter than 24 hours. The camera 100 according to the present embodiment is preferable at least with a configuration that a narrower (smaller) non-exposure follow-up range $\Delta$BvTH is set when the image capturing time interval of the intermittent image capturing is longer and a wider (larger) non-exposure follow-up range $\Delta$BvTH is set when the image capturing time interval is shorter. In other words, the exposure control unit 111 sets a narrower (smaller) non-exposure follow-up range $\Delta$BvTH in a case that the image capturing time interval is set as a second interval which is a longer time interval than a first interval, compared to a case that the first interval is set. With this configuration, when performing intermittent image capturing, the camera 100 according to the present embodiment can execute an exposure control so that the brightness of the entire image and subject smoothly changes among the plural images. Thus, the camera 100 according to the present embodiment can acquire a moving image in which the occurrence of brightness variation is suppressed by combining the plural images in the above condition. FIG. 7 is a diagram that illustratively explains this manner and a diagram that illustratively explains changes in brightness of a plurality of images acquired in an image capturing process according to the embodiment of the present invention. The changes in the luminance values in FIG. 7 are substantially same as the changes in the luminance values in above described FIG. 6. As illustrated in FIG. 7, since the camera 100 according to the present embodiment sets the size of the non-exposure follow-up range $\Delta$BvTH according to the image capturing time interval of the intermittent image capturing, a plurality of images in which variation of brightness is suppressed can be acquired for a time-lapse moving image. Therefore, the camera 100 according to the present embodiment can prevent reduction of the quality of the moving image in which plural images acquired by performing intermittent image capturing are combined.

FIGS. 3A and 3B will be referred again. When the previously set image capturing time interval is equal to or longer than 24 hours in step S317, the camera control unit 110 sets the size of the non-exposure follow-up range $\Delta$BvTH based on a difference between the image capturing time interval and a predetermined time interval. More specifically, the camera 100 extracts about 24 hours from the image capturing time interval set by the user and the process returns to step S307. When performing the image capturing outside, substantially same changes in environmental lights likely occur in a cycle of one day (24 hours). Thus, the camera 100 according to the present embodiment executes the process in step S317 to set the non-exposure follow-up range ΔBvTH using the time calculated by extracting about 24 hours from the image capturing time interval, when image capturing time interval of the sequential image capturing is equal to or longer than 24 hours. For example, when the previously set image capturing time interval is 25 hours, since the time interval calculated by extracting 24 hours from 25 hours is 1 hour, the exposure control unit 111 sets the non-exposure follow-up range ΔBvTH as ±0.3 stops. Here, in step S317, the predetermine time interval to be extracted from the image capturing time interval does not always have to be just 24 hours and, for example, 24 hours±5 minutes may be set as the predetermined time interval. Further, since the change cycle of environmental light differs depending on the areas, dates and time, in step S317, the predetermined time interval to be extracted from the image capturing time interval may be a time interval other than 24 hours.

Next, in step S318, the camera control unit 110 determines whether or not the time measurement by a timer (not shown) has reached next image capturing time. More specifically, the camera control unit 110 determines whether or not it has reached the next image capturing time according to whether or not elapsed time from the previous image capturing time has reached the time which is calculated by extracting a predetermined preparation time (for example, 10 seconds, or the like) from the previously set time interval. The process in step S318 is repeated until the time measurement by the timer reaches the next image capturing time.

Next, in step S319, the camera control unit 110 newly acquires a luminance value based on the image acquired using the sensor 103. Next, in step S320, the camera control unit 110 determines whether or not the current luminance value acquired in step S319 is included in a currently set non-exposure follow-up range ΔBvTH. When the camera control unit 110 determines that the current luminance value is not included in the non-exposure follow-up range ΔBvTH (NO in step S320), the process proceeds to step S321. In step S321, the exposure control unit 111 executes an exposure control and changes the exposure based on the luminance value acquired in step S319. Then, a new non-exposure follow-up range ΔBvTH based on the luminance value acquired in step S319 is set. Here, the new non-exposure follow-up range ΔBvTH is in the same size as the previously set non-exposure follow-up range ΔBvTH (in the processes in steps S306 to S316, for example). Further, in step S321, the exposure control unit 111 changes the exposure by firstly changing the image capturing sensitivity and shutter speed. This configuration can prevent that a small difference in brightness occurs in the acquired plural images caused by variation of depth of field or a mechanical operation of the aperture 102.

When the camera control unit 110 determines that the current luminance value is included in the non-exposure follow-up range ΔBvTH (YES in step S320), the process proceeds to step S322. In step S322, the exposure control unit 111 proceeds to a process in step S323 without changing the already set exposure. In other words, in step S322, the camera 100 maintains the exposure set in the previous image capturing. Here, according to the present embodiment, in one sequential image capturing, the AF control may be executed once again in the process in step S321 or S322 even though it is in the structure that the lens position of the focus lens is not changed.

Next, in step S323, the camera control unit 110 uses the sensor 103 to perform image capturing and ends the time measurement currently executed by the timer (not shown).

Then, the record control unit 108 records, in the memory 106, the images acquired in the image capturing. Next, in step S324, the camera control unit 110 determines whether or not the number of image capturing which has been executed has reached the total number of image capturing. When the camera control unit 110 determines that the total number of image capturing has been reached (YES in step S324), the camera control unit 110 ends the current image capturing process. Further, when the camera control unit 110 determines that the total number of image capturing has not reached. (NO in step S324), the camera control unit 110 starts new time measurement using the timer and returns to the process in step S318. The image capturing process according to the present embodiment has been described.

When the plural images, which are temporally continuous, are acquired in the image capturing process, the camera control unit (a moving image acquisition means) 110 acquires (generates) a time-lapse moving image by combining the plural images one another in order of the performed image capturing. The acquired time-lapse moving image is registered in the memory 106 by the record control unit 108. Here, the time-lapse moving image may be acquired after the image capturing process ends or may be acquired during the image capturing process. Further, the plural images acquired in the image capturing process may be transmitted to an external device provided outside the camera 100 and the external device may generate the time-lapse moving image. In this case, the camera control unit (a moving image acquisition means) 110 may acquire the time-lapse moving image generated by the external device.

As described above, the camera 100 according to the present embodiment sets the non-exposure follow-up range ΔBvTH based on the image capturing time interval of the intermittent image capturing. With this configuration, since the camera 100 according to the present embodiment can set the non-exposure follow-up range ΔBvTH in the most preferable size based on the image capturing time interval, the plural images that suppress unnatural changes of the brightness of the entire image or subject can be acquired. Thus, the camera 100 according to the present embodiment can prevent reduction of the quality of the moving image in which the plural images acquired by performing intermittent image capturing are combined.

An embodiment of the present invention has been described above; however, the present invention is not limited this embodiment and various modifications and changes can be made within the scope of the present invention. For example, the above described embodiment describes a configuration that the amount of the previously set non-exposure follow-up range is ΔBvTH not changed during a series of intermittent image capturing; however, this example does not set any limitation. For example, during the image capturing process and when the non-exposure follow-up range ΔBvTH is already set, the amount of the non-exposure follow-up range ΔBvTH may be changed in response to a change of the image capturing time interval made by the user, based on the changed image capturing time interval. Further, the above described embodiment describes a configuration that the non-exposure follow-up range ΔBvTH is set after executing the first image capturing of intermittent image capturing; however, this example does not set any limitation. For example, the exposure control unit 111 may set the non-exposure follow-up range ΔBvTH based on information related to time when a sequential image capturing is performed, before executing the first image capturing of intermittent image capturing.

Further, the above described embodiment describes a configuration that, when the image capturing time interval is longer than 5 hours and equal to or shorter than 24 hours, the non-exposure follow-up range is uniformly set as 0 (ΔBvTH=0); however, this example does not set any limitation. In other words, the above described embodiment describes that a predetermined cycle, in which it is assumed that environmental light changes in a constant direction, is 24 hours; however, this example does not set any limitation.

For example, the predetermined cycle may be set as a time interval other than 24 hours. More specifically, when the predetermined cycle is set as 17 hours, a smaller non-exposure follow-up range ΔBvTH is set gradually as the image capturing time interval becomes longer while the image capturing time interval is shorter than 17 hours. Then, when the image capturing time interval exceeds 17 hours, a value (an image capturing time interval) calculated by extracting 17 hours from the image capturing time interval is used and a determination to set a new non-exposure follow-up range ΔBvTH is made.

With this configuration, a proper non-exposure follow-up range ΔBvTH according to the image capturing time interval can be set as handling a case that changes in brightness of environmental light become substantially the same within one day, for example, at the time of sunrise or at the time of sunset. Here, the predetermined cycle that environmental light is assumed to change in a constant direction may be set by user's manual operation, or a default value which is previously set in the camera 100 may be used.

As described above, as the image capturing apparatus according to the above described embodiment is preferable at least with a configuration that a narrower non-exposure follow-up range ΔBvTH is set as the image capturing time interval in a predetermined cycle is longer, and a wider non-exposure follow-up range ΔBvTH is set as the image capturing time interval is shorter. Further, the above described embodiment describes a configuration that, as information related time when the intermittent image capturing is performed, a non-exposure follow-up range ΔBvTH is set based on sequential image capturing time intervals; however, this example does not set any limitation. For example, as the information related to time when the intermittent image capturing is performed, a non-exposure follow-up range ΔBvTH in a time-lapse moving image mode may be set based on the information related to a time period of day when the sequential image-capturing is performed. Hereinafter, this configuration will be explained in detail.

For example, in the memory 106, data in which 24 hours is divided, in unit of one minute, into four time periods of morning (5:00 to 6:59), daytime (7:00 to 15:59), evening (16:00 to 18:59), and night (19:00 to 4:59) is stored in advance. When executing intermittent image capturing, the camera control unit 110 sets the non-exposure follow-up range ΔBvTH based on a difference between sequential time periods when the image capturing is performed in the above described plural time period. For example, when first image capturing and second image capturing, which are sequential, are sequentially executed in the time periods of "daytime" and "evening," the difference between the sequential time periods when the image capturing is performed is one step (first difference). On the other hand, when the first image capturing and second image capturing are sequentially executed in the time periods of "daytime" and "night," the difference between the two time periods is two steps (second difference).

As described above, when the difference between sequential time periods when the image capturing s executed is 1 step, since the possibility that the luminance value changes due to the chances in environmental light is relatively small, the exposure control unit 111 sets the non-exposure follow-up range ΔBvTH as ±0.5 stops. Further, when the difference between sequential time periods when the image capturing is performed is 2 steps, since the possibility that the luminance value changes due to the changes in environmental light is relatively high, the exposure control unit 111 sets the non-exposure follow-up range ΔBvTH as ±0.1 stop. In other words, the exposure control unit 111 sets a narrower (smaller) non-exposure follow-up range ΔBvTH as the difference between sequential time periods when the image capturing is performed is larger. The image capturing apparatus that has the above described configuration can also prevent, an unnatural change in brightness of a moving image in which plural images, which are acquired by performing the intermittent image capturing.

Here, for example, when the image capturing of the first image capturing is performed in the "morning" time period and the second image capturing is performed in the "night" time period, the difference between the time periods when the sequential image capturing is performed is set as 1 step. In other words, the difference between the time periods when the sequential image capturing is performed is what is set based on an absolute value of the difference between the time periods when the sequential image capturing is performed in 24 hours. Further, the above described plural time periods are not limited to morning, daytime, evening, and night, and time periods other than the above may be employed. Further, the time periods of morning, daytime, evening, and night are not limited to the above described time settings. Since the time when environmental light changes within 24 hours varies depending on the area and time, for example, the morning time period may be set from 5:00 to 7:59.

Here, in a case that the image capturing time interval set by the user is 3 hours and the image capturing is performed at 8:00, since the following image capturing is performed at 11:00, the changes in the environment light are assumed to be relatively small. On the other hand, even in a case that the image capturing time interval is 3 hours in the same manner, when the image capturing is performed at 15:00 and the following image capturing is performed at 18:00, the changes of environmental light are assumed to be relatively large. In other words, even when the image capturing time interval is the same, the degree of changes in environmental light varies depending on the difference between the time periods when sequential image capturing is performed. Thus, the camera 100 may set the exposure follow-up range ΔBvTH based on both of the image capturing time interval to perform intermittent image capturing and information related to the time periods when image capturing is performed. The camera 100 with this configuration makes difference in the amount of the non-exposure follow-up range ΔBvTH according to the time when the sequential image capturing is performed even though the image capturing time interval is the same, for example. More specifically, in a case that the image capturing time interval is the same, the exposure control unit 111 sets a wider non-exposure follow-up range ΔBvTH when the first image capturing in sequential image capturing starts in the "daytime" or "night" time period compared to the case that the first image capturing in sequential image capturing starts in the "morning" or evening time period.

As described above, when intermittent image capturing is performed, the camera 100 according to the embodiment of the present invention may have a configuration that the non-exposure follow-up range is set based on at least information related to the time of the sequential image capturing. The camera 100 having this configuration can prevent an unnatural change (occurrence of variation) in the light in a moving image in which plural images acquired by performing intermittent image capturing are combined. Thus, the camera 100 can prevent reduction of the quality of the moving image in which the images acquired by performing intermittent image capturing are combined.

Further, the above described embodiment describes that the non-exposure follow-up range ΔBvTH is a range of luminance values; however, this example does not set any limitation. For example, a range based on exposure (exposure control value) corresponding to an acquired luminance value may be used as the non-exposure follow-up range ΔBvTH. In other words, the non-exposure follow-up range ΔBvTH may be any of a range that exposure is not actually changed or a range that the luminance value may be a trigger to determine a presence or an absence of an exposure change, as long as it is a range that the exposure is not changed according to the changes in the luminance value of a subject.

Further, in addition to the above described embodiment, for example, the exposure control unit 111 may change the exposure when it is detected that the luminance value sequentially changes in the same direction or the light changes as exceeding the non-exposure follow-up range ΔBvTH more than once. The camera 100 with this configuration accurately determines whether or not the luminance value changes due to the changes in the environmental light and performs an exposure control. Here, the camera 100 with this configuration can accurately determine that the change of the luminance value has occurred due to the changes in the environmental light by making the number of luminance value acquisitions greater than the total number of image capturing. For example, in a case that the intermittent image capturing is executed, when the total number of image capturing is set as ten times and the image capturing time interval is set as 1 hour, the camera control unit 110 acquires the luminance value in every 30 minutes after the first image capturing is started. In this case, the luminance value is acquired twice as the total number of image capturing (20 times). Then, when the acquired luminance value exceeds the non-exposure follow-up range ΔBvTH and when this luminance value and luminance value acquired immediately before this luminance value have changed in the same direction, the exposure control unit 111 changes the exposure as exposure control of each image capturing. The camera 100 having this configuration, can shorten the time required to chance the exposure after the change of the luminance value when the intermittent image capturing is performed.

Further, in addition to the above described embodiment, the camera 100 may have a configuration to shift the state of the camera 100 to a standby state (a power saving state) between sequential image capturing in the image capturing process. More specifically, the camera control unit 110 sets the state of the camera 100 to a standby state in a period after setting the non-exposure follow-up range ΔBvTH and after the process in S318 completes. In this standby state, for example, the power supply to each unit other than the camera control unit 110 is stopped and behavior by the camera 100 related to the process in step S318 such as time measurement by the timer is executed. The camera 100 having the above described configuration can suppress the power consumption in the time-lapse moving image mode.

Further, the above described embodiment describes a configuration that preliminary image capturing is executed before the image capturing (image acquisition for generating time-lapse moving image) to acquire the luminance value and distance to subject; however, this example does not set any limitation. For example, the camera 100 may be configured to obtain information related to the luminance value and distance to subject based on the images acquired in the previous image capturing in the image capturing process. In particular, in a case that the image capturing time interval to perform intermittent image capturing is relatively short (for example, shorter than 5 minutes), the possibility that the luminance value and environmental light change is low. Therefore, in this case, even when the exposure control is performed using the luminance value based on the images acquired by previous image capturing without executing preliminary image capturing, images having a preferable brightness according to the changes of the luminance value can be obtained.

Here, the above described embodiment has explained a configuration that images of a subject is captured in each image capturing time interval to obtain the images for a time-lapse moving image; however, this example does not set any limitation. For example, the above described characteristic configuration of an aspect of the present invention may be applied to a configuration that moving images are acquired continuously after starting image capturing, and the images for a time-lapse moving image are set (decimated) from a plurality of images (frames) that composing the moving image based on the image capturing time interval. In this case, at least as a frame rate of the moving image, a frame rate for acquiring images in a period shorter than the image capturing time interval settable for a time-lapse moving image is set. Further, in this case, the time interval for performing the image capturing to acquire the sequential images used to generate the time-lapse moving image corresponds to the above described image capturing interval (the time interval for executing intermittent image capturing).

Here, the above described embodiment describes an example that the width (size) of the non-exposure follow-up range ΔBvTH indicating the blind zone related to the exposure control is controlled based on the information related to the time for performing the intermittent image capturing; however, this example does not set any limitation. For example, the degree of change the exposure may be set according to the changes in the luminance value of the subject, based on the information related to the time for performing the intermittent image capturing. For example, even in a case that the changes of the luminance value is the same, the actual change amount of the exposure is made smaller when the interval in the time-lapse moving image mode is 30 seconds, compared to a case that the interval is 1 hour. A specific method to vary the degree of changing the exposure may be a configuration to vary, according to an interval or the like, a variable to be multiplied to calculated exposure or a configuration to vary the number of execution of changing the exposure according to the changes in luminance.

Further, the above described embodiment describes a configuration that the image processing unit 105, memory 106, record control unit 108, camera control unit 110, exposure control unit 111 and like operate in cooperation with one another so that the operation of the camera 100 is controlled; however, this example does not set any limitation. For example, the operation of the camera 100 may be controlled by storing a (computer) program according to the flow illustrated in FIG. 2 is stored in the memory 106 and executing the program by the camera control unit 110 which includes a microcomputer.

Further, the program may be in any format such as an object code, a program executed by an interpreter, script data supplied to the OS, or the like, as long as it has a function as a program. Further, a recording medium to supply the program may be, for example, a magnetic recording medium such as a hard disk, a magnetic tape or the like, or an optical/magnetooptical recording medium.

Further, the above described embodiment explains a digital camera as an example of the image capturing apparatus to implement an aspect of the present invention; however this example does not set any limitation. For example, the configuration may employ an image capturing apparatus other than a digital camera, for example, a portable device such as a digital video camera, a smartphone, or the like, or a security camera or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-210714, filed Oct. 27, 2015, and 2016-106640, filed May 27, 2016, which are hereby incorporated by reference herein in their entirety.

What is claimed is:

1. An image capturing apparatus that performs intermittent image capturing to acquire a moving image which is composed of combined plural images, the image capturing apparatus comprising:
    an image sensor configured to capture an image of a subject;
    at least one processor, the at least one processor functioning, according to a program stored in a memory, as:
    a luminance value acquisition unit configured to acquire a luminance value of the subject;
    an exposure control unit configured to control exposure according to the luminance value acquired by the luminance value acquisition unit; and
    a range setting unit configured to set a predetermined range in which the exposure control unit does not change the exposure according to a change of the luminance value acquired by the luminance value acquisition unit,
    wherein the range setting unit sets the predetermined range based on information related to time when intermittent image capturing is performed.

2. The image capturing apparatus according to claim 1, wherein the information related to time when the intermittent image capturing is performed is information related to a time interval when sequential image capturing is performed during the intermittent image capturing.

3. The image capturing apparatus according to claim 2, wherein, upon performing the intermittent image capturing, the range setting unit sets the predetermined range smaller when the time interval is a second interval which is longer than a first time interval, compared to a case that the time interval is the first interval.

4. The image capturing apparatus according to claim 3, wherein, upon performing the intermittent image capturing, in a case that the time interval exceeds a predetermined time interval, the range setting unit sets the predetermined range based on a difference between the time interval and the predetermined time interval.

5. The image capturing apparatus according to claim 4, wherein the predetermined time interval is a time interval within a range of time in which a change in environmental light is constant.

6. The image capturing apparatus according to claim 5, wherein the predetermined time interval is about 24 hours.

7. The image capturing apparatus according to claim 1, wherein the information related to time when intermittent image capturing is performed is information related to a time period when intermittent image capturing is performed.

8. The image capturing apparatus according to claim 7, wherein the time period when the intermittent image capturing is performed is among a plurality of time periods that divide a predetermined period of time,
    wherein, upon performing the intermittent image capturing, the range setting unit sets the predetermined range smaller when a difference between the time periods when the intermittent image capturing is performed is a second difference, compared to a case that the difference between the time periods when the intermittent image capturing is performed is a first difference in the intermittent image capturing, and
    wherein the first difference is smaller than the second difference.

9. The image capturing apparatus according to claim 8, wherein the time periods when the intermittent image capturing is performed are a plurality of time periods including morning, daytime, evening, and night.

10. The image capturing apparatus according to claim 1, wherein, when a sequence of a first image capturing and a second image capturing in the intermittent image capturing are performed, the range setting unit sets the predetermined range with reference to a first luminance value that is based on the luminance value corresponding to the first image capturing, and wherein the predetermined range is a luminance range.

11. The image capturing apparatus according to claim 10, wherein a second luminance value is based on the luminance value corresponding to the second image capturing, and wherein the exposure control unit controls not to change the exposure when the second luminance value is included in the predetermined range with reference to the first luminance value and to change the exposure according to the second luminance value when the second luminance value is not included in the predetermined range with reference to the first luminance value.

12. The image capturing apparatus according to claim 1, wherein, when a sequence of a first image capturing and a second image capturing in the intermittent image capturing are performed, the range setting unit sets the predetermined range with reference to the exposure corresponding to a first luminance value based on the luminance value corresponding to the first image capturing, and wherein the predetermined range is a range of the exposure.

13. The image capturing apparatus according to claim 12, wherein a second luminance value is based on the luminance value corresponding to the second image capturing, and wherein the exposure control unit controls not to change the exposure when the exposure based on the second luminance value is included in the predetermined range with reference to the exposure corresponding to the first luminance value and to change the exposure based on the second luminance value when the exposure based on the second luminance value is included in the predetermined range with reference to the exposure corresponding to the first luminance value.

14. The image capturing apparatus according to claim 1, wherein the moving image composed of the combined plural images is a mobbing image that shows temporal changes in the subject are compressed by combining the plural images in order of the intermittent image capturing.

15. The image capturing apparatus according to claim 1, wherein the moving image composed of the combined plural images is a moving image composed of images which are acquired by performed image capturing with time intervals of about one or more second(s).

16. The image capturing apparatus according to claim 1, the at least one processor further functioning as:
a moving image acquisition unit configured to acquire the moving image composed of the combined plural images by combining plural images acquired by performed intermittent image capturing in the order of the performed intermittent image capturing.

17. The image capturing apparatus according to claim 1, wherein, when the exposure can be changed by changing an aperture value, a shutter speed, and an image capturing sensitivity and intermittent image capturing is performed, the exposure control unit controls to change the exposure by firstly changing the shutter speed and the image capturing sensitivity according to a change in the luminance value.

18. The image capturing apparatus according to claim 1, the at least one processor further functioning as:

a determination unit configured to determine whether or not the subject as an image capture target is placed indoors, wherein, upon performing the intermittent image capturing, when the determination unit determines that the subject as an image capture target is placed indoors, the range setting unit sets the predetermined range within a previously set range, and wherein, upon performing the intermittent image capturing, when the determination unit determines that the subject as an image capture target is not placed indoors, the range setting unit sets the predetermined range based on the information related to the time when the intermittent image capturing is performed.

19. An image capturing apparatus that includes an image sensor and is settable with a time-lapse moving image mode for acquiring, by the image sensor, an image used for generating a time-lapse moving image, the image capturing apparatus comprising:

at least one processor, the at least one processor functioning, according to a program stored in a memory, as:
a luminance value acquisition unit configured to acquire a luminance value of a subject;
an exposure control unit configured to control exposure according to the luminance value acquired by the luminance value acquisition unit; and
a setting unit configured to set a degree of change, by the exposure control unit, of the exposure according to a change in the luminance value acquired by the luminance value acquisition unit,
wherein, when the time-lapse moving image mode is set, the setting unit sets the degree of change based on information related to time when the intermittent image capturing is performed,
wherein the information related to the time is information related to a time interval to perform image capturing to acquire sequential images used for generating the time-lapse moving image, and
wherein, when the time-lapse moving image mode is set, the setting unit sets the degree of change smaller when the time interval is a second interval which is smaller than a first time interval, compared to a case that the time interval is the first time interval.

20. A control method of an image capturing apparatus that includes an image sensor and performs intermittent image capturing, by the image sensor to acquire a moving image in which plural images are combined, the control method comprising:
acquiring a luminance value of a subject;
controlling exposure according to the luminance value; and
setting a predetermined range in which exposure is not changed due to changes in the luminance value,
wherein the predetermined range is set based on information related to time when intermittent image capturing is performed.

21. A control method of an image capturing apparatus that includes an image sensor and is capable of setting a time-lapse moving image mode to acquire, by the image sensor, an image to generate a time-lapse moving image, the control method comprising:
acquiring a luminance value of a subject;
controlling exposure according to the luminance value; and
setting a degree of change of the exposure due to a change in the luminance value, wherein, in the setting, when the time-lapse moving image mode is set, the degree of change is set based on information related to time when the intermittent image capturing is performed, wherein the information related to the time is information related to a time interval to perform image capturing to acquire sequential images used for generating the time-lapse moving image, and wherein, when the time-lapse moving image mode is set, the setting unit sets the degree of change smaller when the time interval is a second interval which is smaller than a first time interval, compared to a case that the time interval is the first time interval.

22. A non-transitory computer-readable storage medium storing a program for causing a processor to execute a method of controlling an image capturing apparatus that includes an image sensor and performs intermittent image capturing, by the image sensor to acquire a moving image in which plural images are combined, the control method comprising:

acquiring a luminance value of a subject of which image is captured by the image sensor;

controlling exposure according to the luminance value; and setting a predetermined range that exposure is not changed due to a change in the luminance value, wherein the predetermined range is set based on information related to time when intermittent image capturing is performed.

23. A non-transitory computer-readable storage medium storing a program for causing a processor to execute a method of controlling an image capturing apparatus that includes an image sensor and is capable of setting a time-lapse moving image mode to acquire, by the image sensor, an image to generate a time-lapse moving image, the control method comprising:

acquiring a luminance value of a subject;

controlling exposure according to the luminance value; and setting a degree of change of the exposure due to a change in the luminance value acquired in the acquiring, wherein when the time-lapse moving image mode is set, the degree of change is set based on information related to time when the intermittent image capturing is performed, wherein the information related to the time is information related to a time interval to perform image capturing to acquire sequential images used for generating the time-lapse moving image, and wherein, when the time-lapse moving image mode is set, the setting unit sets the degree of change smaller when the time interval is a second interval which is smaller than a first time interval, compared to a case that the time interval is the first time interval.

* * * * *